United States Patent
Dean et al.

(10) Patent No.: US 6,498,809 B1
(45) Date of Patent: Dec. 24, 2002

(54) VIDEO BITSTREAM ERROR RESILIENT TRANSCODER, METHOD, VIDEO-PHONE, VIDEO-COMMUNICATOR AND DEVICE

(75) Inventors: Frederick D. Dean, Chicago, IL (US); James C. Brailean, Park Ridge, IL (US); Stephen N. Levine, Itasca, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/009,149

(22) Filed: Jan. 20, 1998

(51) Int. Cl.[7] .................................................. H04N 7/12
(52) U.S. Cl. ..................................... 375/240; 348/845.1
(58) Field of Search ....................... 375/240.27, 240.28, 375/240.16, 240.2; 382/252; 348/845.1, 845.2, 845.3, 425.2, 407.1, 402.1, 428.3, 425.4; H04N 7/12

(56) References Cited

U.S. PATENT DOCUMENTS

| | | | |
|---|---|---|---|
| 5,420,872 A | | 5/1995 | Hyodo et al. |
| 5,455,629 A | | 10/1995 | Sun et al. |
| 5,614,958 A | | 3/1997 | Shikakura |
| 5,708,659 A | * | 1/1998 | Rostoker et al. ............ 370/392 |
| 5,778,191 A | * | 7/1998 | Levine et al. ............... 395/200 |
| 5,862,153 A | * | 1/1999 | Kikuchi et al. ............... 371/42 |
| 6,065,017 A | * | 5/2000 | Barker ....................... 707/202 |
| 6,111,916 A | * | 8/2000 | Talluri et al. ............... 375/240 |
| 6,198,783 B1 | * | 3/2001 | Campana, Jr. .............. 375/346 |
| 2002/0029363 A1 | * | 3/2002 | Kikuchi et al. ............. 714/752 |

* cited by examiner

*Primary Examiner*—Nhon Diep
(74) *Attorney, Agent, or Firm*—Kenneth A. Haas

(57) ABSTRACT

A video bitstrean error resilient transcoder (100), method (300), video-phone, and video-communicator are provided wherein error resilience is implemented by verifying a syntax of a video bitstream and replacing the video bitstream between resynchronization markers with a valid syntax that is used by a decoder to produce a video sequence.

37 Claims, 1 Drawing Sheet

VIDEO BITSTREAM ERROR RESILIENT TRANSCODER, METHOD, VIDEO-PHONE, VIDEO-COMMUNICATOR AND DEVICE

FIELD OF THE INVENTION

The present invention relates to communication of video bitstreams and, more particularly, to correction of video bitstreams.

BACKGROUND OF THE INVENTION

Video compression is designed to represent full motion video with as small a number of information bits as possible, and still preserve acceptable quality. Acceptable quality is defined as the level of perceived quality required by the viewer of the decoded video. To preserve acceptable quality, many video compression encoders and decoders (i.e., video codecs) try to represent each frame of encoded video by predicting it from the previously encoded frame. Generally, motion compensated prediction is used to reduce the amount of information needed to be coded for each frame. This approach is used in the ISO MPEG- 1, MPEG-2 and MPEG-4 standards, as well as in the ITU H.261 and H.263 standards. When motion compensated prediction is used between frames in a video sequence, the error in the prediction must be encoded and successfully transmitted to the decoder to preserve the quality of the decoded video sequence.

To further improve the amount of compression achieved by a video encoder, several tools or modes, in addition to motion compensated prediction, are available in today's video compression standards. How these tools are utilized must also be transmitted to the decoder to preserve the quality of the decoded video sequence. This mode information combined with the motion information (motion vectors) prediction information (discrete cosine transform coefficients) form a video bitstream. It is this video bitstream which is transmitted to the video decoder to produce video sequences with acceptable quality.

Due to the strong dependence between the information contained in a video bitstream and the perceived quality of the decoded video sequence, video decoders are highly susceptible to bit errors. A single bit error in a video bitstream can cause a video decoder to interpret the information remaining in the bitstream incorrectly. This situation is generally referred to as a loss of synchronization. That is, the decoder is no longer synchronized with the start of the codewords contained in the video bitstream.

To guard against the possibility that the decoder and video bitstream never resynchronize, all video compression standards require that resynchronization markers be inserted into with the video bitstream at predetermined locations. These resynchronization markers are unique codewords that can be located within a video bitstream. Currently, video decoders utilize these markers to resynchronize in case of a bit error.

The ability to resynchronize after an error is important. However, it does not guarantee that the video quality will be acceptable if the video bitstream has been corrupted by an error or errors. Concealment of the information lost between resynchronization markers is necessary if acceptable video quality is to be maintained. Due to the constraints imposed by real-time operation, it is difficult for a video decoder to provide the necessary error concealment.

For instance, prior art shows that in order to provide some error concealment capabilities, an entirely new system for transmitting digital video is required. A major problem with this approach is that it does not conform to any of the known video compression standards. The method is completely dependent upon the use of a very powerful Cyclic Redundant Codes (CRC). Once an error is detected, sophisticated messaging must occur between the error detection device and the video decoder. This type of processing and communication within a device is very complicated and difficult to build. Furthermore, since it does not comply with any video compression standards, it can not interoperate with any ISO-MPEG or ITU compliant video decoder.

Thus, there is a need for a method and device to provide efficient error resilient video bitstream decoding which does not conflict with current or future video compression standards.

DETAILED DESCRIPTION OF A PREFERRED EMBODIMENT

The present invention is easier and more efficient to implement than prior art error resilient embodiments. The present invention may be coupled with existing non-resilient decoders to create a resilient product, thus leveraging existing solutions and minimizing cost.

Error resilience is difficult to implement in a pipelined application specific integrated circuit (ASIC) which is used for some video decoders. The present invention describes implementing these features on a programmable device that is discrete from the decoder. The resulting invention is very efficient because it works entirely within the low bitrate compressed domain and can share a programmable processor with other functions while retaining the efficiencies of the ASIC.

Figure 1:
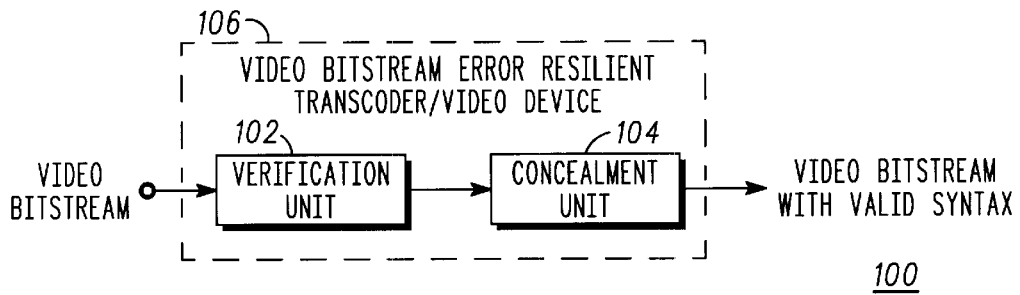
FIG. 1 is a block diagram of one embodiment of a video bitstream error resilient transcoder in accordance with the present invention.

FIG. 1, numeral 100, shows a block diagram of one embodiment of the video bitstream error resilient transcoder (106) of the present invention. The error resilient transcoder includes: A) a verification unit (102), arranged to receive a video bitstream, for verifying a syntax of the video bitstream; and B) a concealment unit (104), coupled to the verification unit, for, where the video bitstream between resynchronization markers is syntactically invalid, replacing the video bitstream between the resynchronization markers with a valid syntax that is used by a decoder to produce a video sequence. The verification unit (102), in verifying the video bitstream, typically locates unique (i.e., predetermined) resynchronization markers and verifies whether the video bitstream between the resynchronization markers is syntactically valid. In a preferred embodiment, the valid syntax includes motion vectors, discrete cosine transform (DCT) coefficients that are entropy encoded and header information. The valid syntax may be header information for producing the video sequence, header information and motion vectors for producing the video sequence, or header information, motion vectors and DCT coefficients for producing the video sequence.

Many compressed video syntaxes use variable length codes between resynchronization (resync) markers. Often, errors can be detected by: A) the number of such codes found between resync markers; B) illegal code words defined in video standards; and/or C) out of range parameters such as DCT coefficients and motion vectors. The present invention uses these techniques to identify invalid bitstreams and replaces the invalid bitstreams with concealment information. In general this technique improves perceptual quality.

The term "replacing" is defined to mean deriving a new bitstream from either the invalid bitstream or a predetermined non-dependent pattern. For example, within the H.263 standard, one may choose the arbitrary pattern of 011111, which corresponds to an inter-macroblock with zero coded motion as the predetermined non-dependent pattern. This pattern is repeated for the expected number of macroblocks between resync markers and sent in place of suspected errors. The expected number is derived by subtracting the picture locations of the resync markers. A valid syntax generally includes motion vectors, DCT coefficients that are entropy encoded and header information. As explained above, the valid syntax is generally header information for producing the video sequence, header information and motion vectors for producing the video sequence, or header information, motion vectors and DCT coefficients for producing the video sequence.

The transmission of a video bitstream from one location to another may introduce errors. For instance, RF interference, multipath and path loss effects are generally the sources responsible for errors in a wireless transmission channel, while crosstalk and thermal noise are generally responsible for errors on a wireline communication channel. If the network protocol is packet-based, then these errors will result in the lost of a packet or packets. Thermal noise and imperfections in the storage media can introduce errors into a stored video bitstream upon its retrieval. In all cases, errors can be introduced into the video bitstream which significantly degrade the quality of the decoded video.

The video bitstream error resilient transcoder may be utilized in a video device such as a video-phone, a video communicator, an archiving system, a camcorder or the like. For example, a server may distribute software or video data and check that data before delivery using the present invention. An archiving system may include a video surveillance system, a video repository, or the like. The present invention improves the video corrupted by packet loss in a network. Furthermore, the present invention may be placed at the output, an intermediate point, or the input of the network. In addition, a personal computer graphics card may include the present invention.

Figure 2:
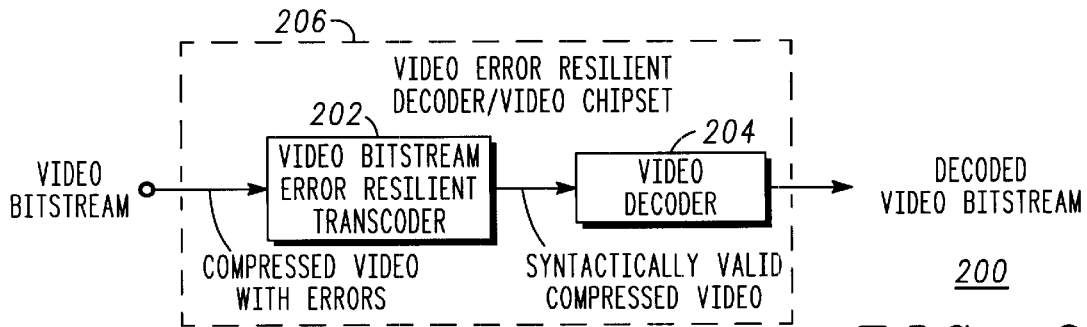
FIG. 2 is a block diagram of one embodiment of a video error resilient decoder implementing a video bitstream error resilient transcoder in accordance with the present invention.

FIG. 2, numeral 200, is a block diagram of one embodiment of a error resilient video decoder/video chipset (206) implementing a video bitstream error resilient transcoder (202) in accordance with the present invention. The error resilient video decoder/video chipset (206) includes a video decoder (204) coupled to an error resilient video transcoder (202).

Figure 3:
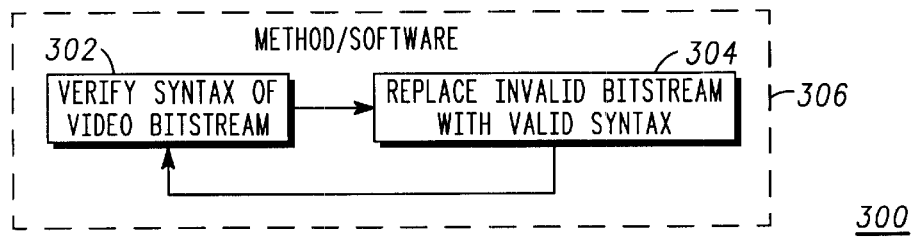
FIG. 3 is a flow chart of one embodiment of steps of a method for providing an error resilient video bitstream in accordance with the present invention.

FIG. 3, numeral 300, is a flow chart of one embodiment of steps of a method for providing an error resilient video bitstream in accordance with the present invention. The arrows represent the scheduling of the steps. The method includes the repeated steps of: A) verifying (302) a syntax of the video bitstream; and B) replacing (304), where the video bitstream includes an invalid video bitstream between resynchronization markers, the invalid video bitstream between the resynchronization markers with a valid syntax that may be used by a decoder to produce a video sequence.

Figure 4:
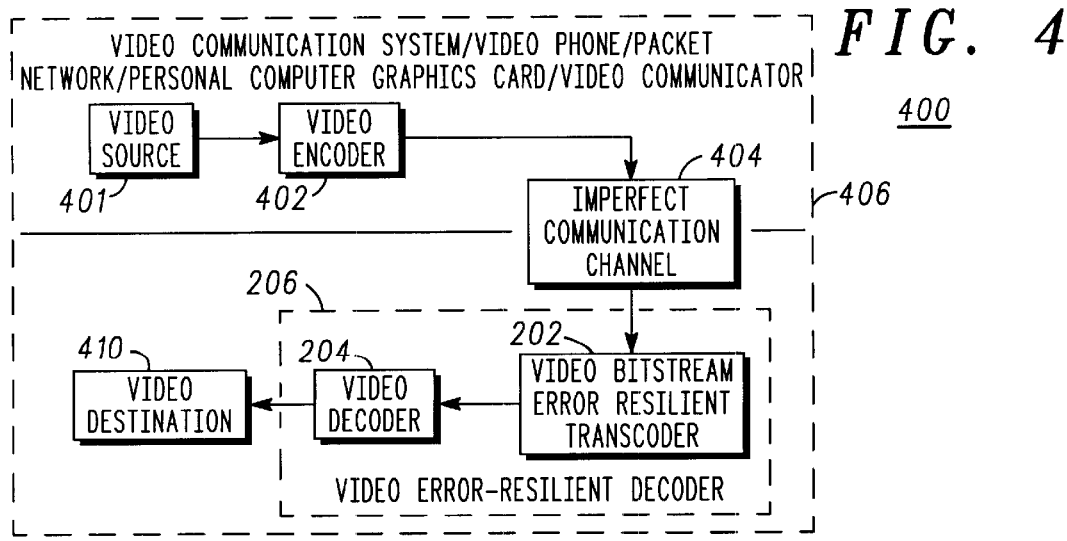
FIG. 4 is a block diagram of one embodiment of a video communication system/video phone/packet network/personal computer graphics card/video communicator implementing a video bitstream error resilient transcoder in accordance with the present invention.

FIG. 4, numeral 400, is a block diagram of one embodiment of a communication system (406)/video phone/packet network/personal computer graphics card/video communicator implementing a video bitstream error resilient transcoder in accordance with the present invention. The video source (401) generates, retrieves, or captures the video to be communicated. The video encoder (402) compresses the video in accordance with a predetermined video compression standard such as H.263. The imperfect communication channel (404) delivers the bits with the possibility of error. The video error-resilient decoder (206) decompresses the video and once again reassembles the video from the source video (401). The video error-resilient decoder (206) includes a video decoder (204) coupled to a video bitstream error-resilient transcoder (202). Finally, the uncompressed video is delivered to the video destination (410), which may display, archive, retransmit, or interpret it.

The present invention may be implemented in software that includes instructions which, when loaded into a microprocessor, cause the microprocessor to implement the steps of the method described above. The software is generally embedded within a video-phone, a chip-set, an archiving system, a camcorder or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A video bitstream error resilient transcoder comprising:

A) a verification unit, arranged to receive a video bitstream, for verifying a syntax of the video bitstream; and B) a concealment unit, coupled to the verification unit, for where the video bitstream between resynchronization markers is syntactically invalid, replacing the video bitstream between the resynchronization markers with a valid syntax that is used by a decoder to produce a video sequence.

2. The video bitstream error resilient transcoder of claim 1 wherein the verification unit, in verifying the video bitstream, locates unique resynchronization markers and verifies whether the bitstream between the resynchronization markers is syntactically valid.

3. The video bitstream error resilient transcoder of claim 1 wherein the valid syntax includes motion vectors, DCT coefficients that are entropy encoded, and header information.

4. The video bitstream error resilient transcoder of claim 1 wherein the valid syntax is one of:

A) header information for producing the video sequence;

B) header information and motion vectors for producing the video sequence; and

C) header information, motion vectors and DCT coefficients for producing the video sequence.

5. A video device that includes a video bitstream error resilient transcoder, comprising:
   A) a verification unit, arranged to receive a video bitstream, for verifying a syntax of the video bitstream; and
   B) a concealment unit, coupled to the verification unit, for, where the video bitstream between resyncrhonization markers is syntactically invalid, replacing the video bitstream between resynchronization markers with a valid syntax that is used by a decoder to produce a video sequence.

6. The video device of claim 5 wherein the verification unit, in verifying the video bitstream, locates unique resynchronization markers and verifies whether the video bitstream between the resynchronization markers is syntactically valid.

7. The video device of claim 5 wherein the valid syntax includes motion vectors, DCT coefficients that are entropy encoded, and header information.

8. The video device of claim 5 wherein the valid syntax is one of:
   A) header information for producing the video sequence;
   B) header information and motion vectors for producing the video sequence; and
   C) header information, motion vectors and DCT coefficients for producing the video sequence.

9. A video-phone that includes a video bitstream error resilient transcoder comprising:
   A) a verification unit, arranged to receive a video bitstream, for verifying a syntax of the video bitstream; and
   B) a concealment unit, coupled to the verification unit, for, where the video bitstream between resynchronization markers is syntactically invalid, replacing the video bitstream between resynchronization markers with a valid syntax that is used by a decoder to produce a video sequence.

10. The video-phone of claim 9 wherein the verification unit, in verifying the video bitstream, locates unique resynchronization markers and verifies whether the video bitstream between the resynchronization markers is syntactically valid.

11. The video-phone of claim 9 wherein the valid syntax includes motion vectors, DCT coefficients that are entropy encoded, and header information.

12. The video-phone of claim 9 wherein the valid syntax is one of:
   A) header information for producing the video sequence;
   B) header information and motion vectors for producing the video sequence; and
   C) header information, motion vectors and DCT coefficients for producing the video sequence.

13. A video communicator that includes a video bitstream error resilient transcoder comprising:
   A) a verification unit, arranged to receive a video bitstream, for verifying a syntax of the video bitstream; and
   B) a concealment unit, coupled to the verification unit, for, where the video bitstream between resynchronization markers is syntactically invalid, replacing the video bitstream between resynchroniztion markers with a valid syntax that is used by a decoder to produce a video sequence.

14. The video communicator of claim 13 wherein the verification unit, in verifying the video bitstream, locates unique resynchronization markers and verifies whether the video bitstream between the resynchroniztion markers is syntactically valid.

15. The video communicator of claim 13 wherein the valid syntax includes motion vectors, DCT coefficients that are entropy encoded, and header information.

16. The video communicator of claim 13 wherein the valid syntax is one of:
   A) header information for producing the video sequence;
   B) header information and motion vectors for producing the video sequence; and
   C) header information, motion vectors and DCT coefficients for producing the video sequence.

17. A method for providing an error resilient video bitstream, comprising the steps of:
   A) verifying a syntax of a video bitstream; and
   B) replacing, where the video bitstream includes an invalid video bitstream between resynchronization markers, the invalid video bitstream between the resynchronization markers with a valid syntax that may be used by a decoder to produce a video sequence.

18. The method of claim 17 wherein verifying the syntax of the video bitstream includes locating unique resynchronization markers and verifying whether the video bitstream between the resynchroniztion markers is syntactically valid.

19. The method of claim 17 wherein the valid syntax includes motion vectors, DCT coefficients that are entropy encoded and header information.

20. The method of claim 17 wherein the valid syntax is one of:
   A) header information for producing the video sequence;
   B) header information and motion vectors for producing the video sequence; and
   C) header information, motion vectors and DCT coefficients for producing the video sequence.

21. Software that includes instructions which, when loaded into a microprocessor, cause the microprocessor to implement the steps of:
   A) verifying a syntax of a video bitstream; and
   B) replacing the video bitstream between resynchronization markers with a valid syntax that is used by a decoder to produce a video sequence where the video bitstream between the resynchroniztion markers is syntactically invalid.

22. The software of claim 21 wherein verifying the syntax of the video bitstream includes locating unique resynchronization markers and verifying whether the video bitstream between the resynchronization markers is syntactically valid.

23. The software of claim 21 wherein the valid syntax includes motion vectors, DCT coefficients that are entropy encoded and header information.

24. The software of claim 21 wherein the valid syntax is one of:
   A) header information for producing the video sequence;
   B) header information and motion vectors for producing the video sequence; and
   C) header information, motion vectors and DCT coefficients for producing the video sequence.

25. The software of claim 21 wherein the software is embedded within one of:
   A) a video-phone;
   B) a chip-set;
   C) an archiving system;

D) a camcorder;

E) a packet network; and

F) a personal computer graphics card.

26. A video bitstream error resilient transcoder comprising:

a verification decoder arranged to receive an input video bitstream and decode the input video bitstream to indicate a validity of its syntax; and a concealment unit, operatively coupled to the verification decoder and, when the verification decoder indicates that the video bitstream is syntactically invalid, to replace the input video bitstream with a valid syntax that is used by a video decoder to produce a video sequence.

27. The video bitstream error resilient transcoder of claim 26, wherein the verification decoder locates resynchronization markers in the input video bitstream and verifies whether the bitstream between the resynchronization markers is syntactically valid; and wherein the concealment unit replaces the video bitstream with valid syntax between said resynchronization makers.

28. The video bitstream error resilient transcoder of claim 26, wherein the concealment unit replaces an invalid segment of the input video bitstream with a valid segment with zero coded motion information.

29. The video bitstream error resilient transcoder of claim 28, wherein the concealment unit replaces an invalid segment of the input video bitstream with a valid segment with zero coded motion information and also a zero texture update.

30. The video bitstream error resilient transcoder of claim 26, wherein the valid syntax replaced by the concealment unit includes at least one of motion vectors, discrete cosine transform (DCT) coefficients and header information.

31. The video bitstream error resilient transcoder of claim 26, wherein the valid syntax replaced by the concealment unit includes at least both motion vectors and discrete cosine transform coefficients.

32. A multiple stage decoder system having video bitstream error resilience comprising:

an error unit arranged to receive an input video bitstream and produce a modified video bitstream comprising a verification decoder arranged to decode the input video bitstream and indicate a validity of its syntax; and a concealment unit, operatively coupled to the verification decoder, to produce the modified video bitstream based on the input video bitstream and, when the verification unit indicates that the video bitstream is syntactically invalid, to replace the input video bitstream with a valid syntax; and a video decoder operatively coupled to the error unit to decode the modified video bitstream and produce an output video sequence.

33. The multiple stage decoder system of claim 32, wherein the verification decoder locates resynchronization markers in the input video bitstream and verifies whether the bitstream between the resynchronization markers is syntactically valid; and wherein the concealment unit replaces the video bitstream with valid syntax between said resynchronization makers.

34. The multiple stage decoder system of claim 32, wherein the valid syntax is one of A) header information for producing the video sequence;

B) header information and motion vectors for producing the video sequence; and

C) header information, motion vectors and DCT coefficients for producing the video sequence.

35. The multiple stage decoder system of claim 32, wherein the valid syntax replaced by the concealment unit includes at least both motion vectors and discrete cosine transform efficients.

36. The video bitstream error resilient transcoder of claim 1 wherein the valid syntax comprises a predetermined pattern.

37. The video bitstream error resilient transcoder of claim 1 wherein the valid syntax comprises a predetermined pattern that will be decoded as a inter-macro block with zero coded motion.

* * * * *